May 16, 1950
L. FINKELSTEIN
NOW BY JUDICIAL CHANGE OF NAME
L. STEIN
ILLUMINATING APPARATUS
Filed Aug. 18, 1947
2,508,242
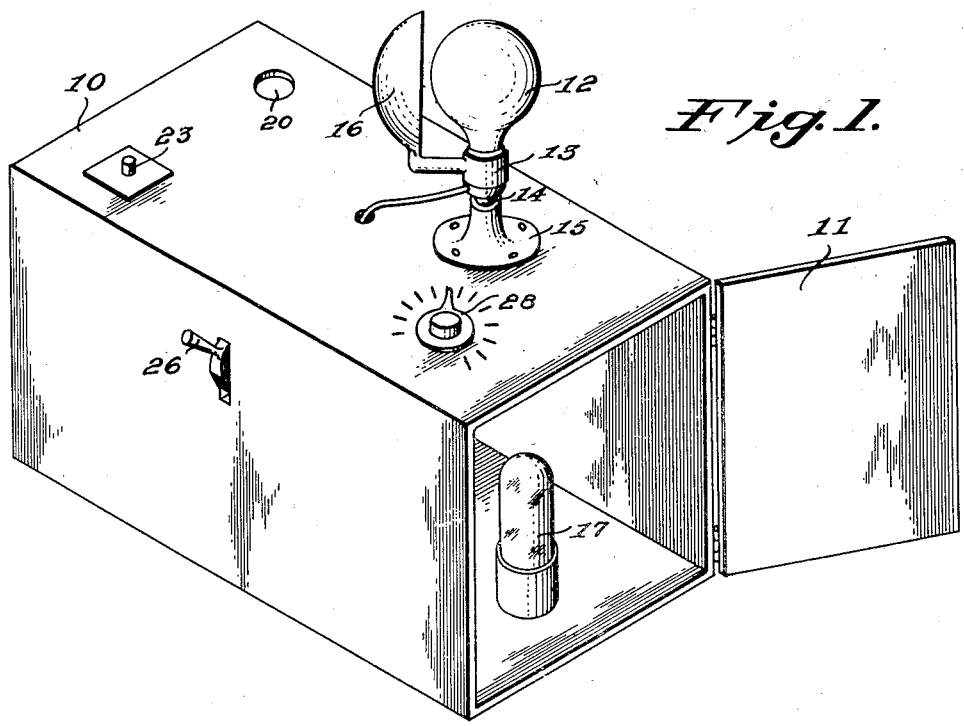
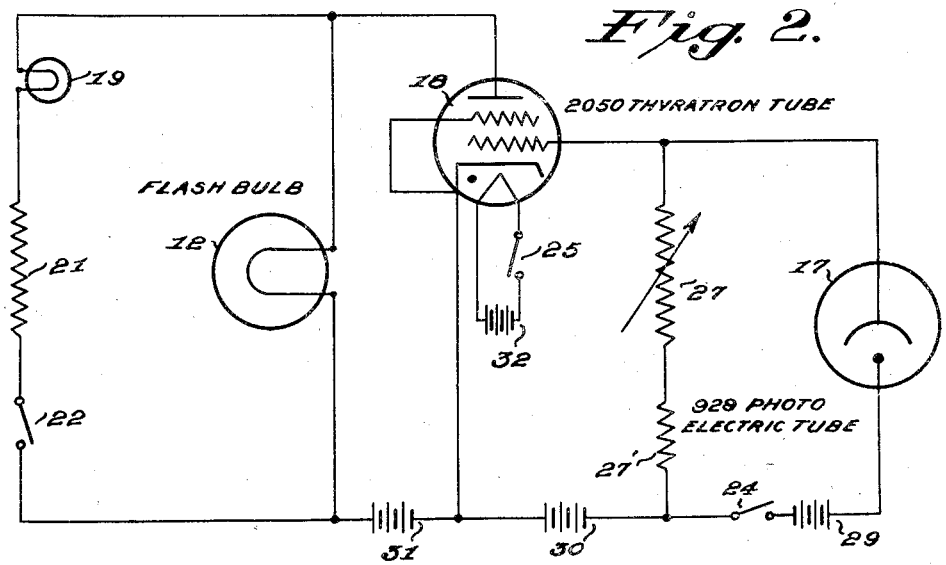
INVENTOR.
Lawrence Finkelstein
BY
James Atkins
Attorney Patented May 16, 1950

2,508,242

UNITED STATES PATENT OFFICE 2,508,242

ILLUMINATING APPARATUS

Lawrence Finkelstein, Washington, D. C., now by judicial change of name Lawrence Stein Application August 18, 1947, Serial No. 769,215

4 Claims. (Cl. 67—31)

This invention relates to illuminating apparatus, and is more particularly concerned with an illuminating apparatus for use in flash photography which is adapted to be positioned distant from a camera having a conventional shutter-synchronized flash bulb, the apparatus being operative in response to the flash of said bulb.

It is well known by those familiar with photography that, in order to secure a good picture of any subject, it is necessary that such subject be well lighted throughout. It often occurs that in attempting to photograph a large indoor or outdoor scene by means of a flash bulb synchronized with the camera shutter, the single flash bulb provides either inadequate or uneven lighting.

Efforts have heretofore been made to overcome this objection by the utilization of additional flash bulbs positioned about the scene for effective illumination and connected by wires to the main flash bulb positioned at the camera so that all could be fired simultaneously. Efforts have also been made to initiate the firing of the auxiliary flash bulbs by photoelectric means responsive to the light from the main flash bulb, but proposed structures for such purpose embody a serious defect in that they produce an appreciable time-lag between the firing of the primary flash bulb and the firing of the secondary flash bulbs. This defect would preclude the use of such devices for photography requiring rapid shutter speeds.

Proposed structures incorporating relays may serve to illustrate this defect. Any relay requires an appreciable fraction of time to either open or close, since it works by virtue of a moving armature. This mechanical motion might require a period of the order of magnitude of $1/25$ second for its performance and would therefore introduce a time-lag of that duration into the response of the apparatus. This would make such an apparatus useless if it were desired to use a shutter speed of $1/500$ second, for example, since the apparatus would not function until after the shutter had closed.

It is accordingly a primary object of this invention to provide an illuminating apparatus for use with a camera-synchronized flash bulb, whereby the above noted objection to previously proposed structures for such purpose is substantially overcome.

A further and more specific object of the invention is the provision of an illuminating apparatus comprising a photoelectric tube, a thyratron tube, and a flash bulb in circuit connection therewith, and wherein electric energy for both tubes and flash bulb is supplied by batteries, thereby adapting the apparatus for use in instances where electric current is not available.

A still further object of the invention is to provide for ready adjustment of the sensitivity of a circuit including the photoelectric tube, together with a test lamp for visually indicating a proper adjustment of the circuit for any natural or artificial illuminating conditions.

A still further object of the invention is the provision of illuminating apparatus of extreme simplicity of construction, which includes relatively few parts, and which is self-contained in a box or case, thereby adapting it for ready transportation from one position of use to another.

Other objects and advantages of the invention will become apparent in the course of the following detailed description, taken in connection with the accompanying drawing, wherein:

Figure 1 is an isometric view illustrating the case with its door in open position, and showing certain of the elements of the apparatus together with manual switch-operating and photoelectric tube sensitivity adjustment control means.

Figure 2 is a diagrammatic view showing the essential elements of the apparatus and the circuit arrangement thereof.

Referring now in detail to the drawing, 10 designates a case provided with a hinged door 11 on one end thereof.

A flash bulb 12 is supported in a socket 13 having a ball-and-socket connection 14 with a base 15 which is rigidly secured to the top wall of the case. A suitable reflector 16 is carried by the socket 13.

A photoelectric tube 17 is disposed within the case adjacent the door 11 within the range of light rays from a primary light source, such as a camera-synchronized flash bulb.

The photoelectric tube may be of any suitable type, but the most preferable is an R. C. A. 929, which is very sensitive to short wavelength light of the type produced by flash bulbs and relatively insensitive to the long wavelength light produced by tungsten lights.

A type 2050 thyratron tube 18 is connected across the output of the photoelectric tube 17, as is shown in Figure 2, and the flash bulb 12 is connected as the load in the thyratron plate circuit. The second grid of this tetrode-type thyratron is connected to the cathode. A triode-type thyratron or other model tetrode thyratron may be used in place of the 2050 tube as long as it is of suitable size and current capacity.

A test lamp 19 and resistor 21 are also connected in the thyratron plate circuit through switch 22, which normally remains open. The lamp 19 is disposed beneath a viewing aperture 20 in the top case wall.

The switch 22 is operable to closed position by a button 23 carried in the top wall of case 10.

A pair of switches 24, 25 are combined in a double-pole single-throw switch and are operable by the lever 26 supported in a side wall of the case. The switches 24, 25 are used to open the photoelectric tube circuit and thyratron heater circuit, respectively, when the unit is not in use.

Resistors 27, 27' are provided in the circuit such that when light falls on the photoelectric tube 17, it produces a current through the resistors, thus causing a positive voltage to appear upon the control grid of the thyratron. If the light is of adequate intensity, the grid becomes sufficiently positive to fire the thyratron. The instant this occurs, a large current surges through the flash bulb 12, thereby igniting it. Since the flash bulb filament is destroyed upon ignition, the plate circuit of the thyratron is automatically opened, and the tube again becomes inoperative.

Provision is made for adjusting the sensitivity of the circuit including the photoelectric tube, such that existing light at any point of operation will not activate the apparatus and ignite the flash bulb. That is, the sensitivity of the circuit must be reduced below the point where room lights, light from open windows, etc., will fire the flash bulb. This is effected by adjusting the variable resistor 27, whereby the voltage appearing on the thyratron control grid is varied for any given amount of illumination falling upon the photoelectric tube.

Resistor 27 may be adjusted to such a sufficiently small value that existing light will fail to produce enough voltage to fire the thyratron. The adjustment of resistor 27 is effected by a suitable control knob 28 carried by the top wall of the case, and such knob may be provided with a pointer movable over a suitable scale.

Batteries 29 and 31, preferably of the 45-volt type, supply plate voltage for the photoelectric tube 17 and the thyratron tube 18, respectively. A 12-volt "C" battery 30 is employed for supplying negative bias to the thyratron control grid, and a 6-volt "A" battery 32 provides current for the thyratron heater.

The test lamp or bulb 19, resistor 21, and switch 22 provide a safety device which enables the photographer to determine whether or not it is safe to insert the flash bulb 12 into its socket 13 under any existing illumination. Upon closing switch 22 by pushing down on button 23 the bulb 19 and resistor 21 are placed in the plate circuit of the thyratron tube. If existing light is strong enough to operate the thyratron, closure of switch 22 causes current to flow through resistor 21 and lamp 19, thereby giving a visual indication through aperture 20 that it is not safe to insert the flash bulb 12. Knob 28 must be turned in a direction to reduce resistor 27 until closure of switch 22 no longer causes lamp 19 to light. Then the photographer may insert the flash bulb with the assurance that existing light will not cause it to fire.

This arrangement serves a two-fold purpose. In addition to acting as a safety device as above described, it provides an excellent means for determining the maximum sensitivity-setting of resistor 27 permissible under given conditions of illumination. By holding switch 22 closed and slowly increasing resistor 27 until the thyratron fires, as will be evidenced by the lighting of lamp 19, it is a simple matter to locate the critical value of resistor 27. If the resistor is set just below this critical value, the apparatus is adjusted to its maximum sensitivity; existing illumination is almost sufficient to activate it, and very little additional light will suffice to fire the apparatus.

Resistor 27' is provided to insure that there will always be some resistance remaining in the plate circuit of the photoelectric tube and grid circuit of the thyratron when resistor 27 is reduced to zero, thereby preventing damage to the tubes.

Resistor 21 is current-limiting and maintains the plate current of the thyratron at a nominal value when switch 22 is closed.

One addition feature of the circuit used in this device is that it makes unnecessary any special arrangement for regaining control of the thyratron once it has fired. Since the grid of a thyratron loses control of the tube after firing, some means must be used to stop the tube from operating continuously. A circuit breaker may be employed to open the plate circuit, or A. C. current may be used on the plate, allowing the grid to regain control during the negative half cycle, to mention two of the methods commonly used. In this device, however, the flash bulb in the plate circuit of the thyratron burns out upon ignition, and the plate circuit is automatically opened. The filament of the flash bulb which completes the plate circuit is destroyed, and the thyratron ceases to operate. This is, therefore, a very efficient and novel arrangement.

While it is appreciated that the combination of a photoelectric tube and a thyratron tube have heretofore been employed for different uses, such a combination has not, so far as I am aware, been used in the manner herein described to fire a standard type wire- or foil-filled flash bulb for use in photography. This combination of photoelectric tube, thyratron, and flash bulb provides for ignition of the flash bulb substantially concurrently with the flashing of a primary camera-synchronized flash bulb due to the elimination of devices such as relays, heretofore used, which provide an undesired time lag.

Having set forth my invention in accordance with a preferred embodiment thereof, what I claim and desire to secure by U. S. Letters Patent is:

1. Illuminating apparatus comprising a photoelectric tube, a thyratron tube in circuit connection with the photoelectric tube, a flash bulb socket in circuit connection with said tubes, a by-pass circuit having a normally open switch therein, a resistor in said by-pass circuit, a test lamp in said by-pass circuit, and an adjustable resistor in said first circuit connection for varying the sensitivity thereof, a flash bulb in said socket and which when turned in provides a closed circuit therethrough and through the said tubes, and a circuit being closed through the test lamp when the flash bulb is turned out and said switch closed, and manually operable means for adjusting said adjustable resistor.

2. Illuminating apparatus of the character described comprising a portable unit in which is contained a light-sensitive photoelectric tube, a thyratron tube connected to the photoelectric tube by a variable resistance coupling, a socket connected in the plate circuit of said thyratron, a flash bulb which may be inserted into the socket, and batteries in circuit connection with the tubes and flash bulb, the unit being operable when energized by light from a remotely located initiating light source to fire the flash bulb, thereby providing instant illumination.

3. Illuminating apparatus as defined in claim 2 and including a test bulb, resistor, and switch connected in the thyratron plate circuit, such switch being normally open and operable when closed to produce a visual indication by lighting of the test bulb if existing illumination is of sufficient intensity to fire the thyratron tube, thereby providing a means of determining whether the flash bulb may be safely inserted into its socket without being fired by existing illumination.

4. Illuminating apparatus of the character described comprising a case having a top wall and a swinging door on one end thereof, a photoelectric tube in the case adjacent to said door, a socket and reflector attached to an external wall of the case by means of a ball-and-socket joint and into which may be inserted a flash bulb, a thyratron tube including a heater positioned within the case, batteries positioned within the case and being in circuit connection with the tubes and socket, variable resistance means for coupling the photoelectric tube and thyratron, such variable resistance means being contained within the case and being adjustable by a manual control positioned on the top wall of the case, a test lamp and current-limiting resistor contained within the case in circuit connection with the tubes and socket, a push-button switch positioned on the top wall of the case and operable when closed to connect said test lamp and current-limiting resistor into the thyratron plate circuit, an aperture cut into the wall of the case at the position of the test lamp to permit visual observation of said lamp, a circuit for the photoelectric tube, a circuit for the thyratron tube heater, and a double pole switch combining a pair of switches respectively disposed in the photoelectric tube circuit and the thyratron heater circuit.

LAWRENCE FINKELSTEIN.

REFERENCES CITED

The following references are of record in the file of this patent:

UNITED STATES PATENTS

| Number | Name | Date |
| --- | --- | --- |
| 2,162,508 | Knowles | June 13, 1939 |
| 2,336,633 | Parson | Dec. 14, 1943 |
| 2,408,764 | Edgerton | Oct. 8, 1946 |